(12) United States Patent
Camenisch et al.

(10) Patent No.: US 11,728,991 B2
(45) Date of Patent: Aug. 15, 2023

(54) PRIVACY-PRESERVING LEAKAGE-DETERRING PUBLIC-KEY ENCRYPTION FROM ATTRIBUTE-BASED ENCRYPTIONS

(71) Applicant: International Business Machines Corporation, Armonk, NY (US)

(72) Inventors: Jan L. Camenisch, Thalwil (CH); Maria Dubovitskaya, Zurich (CH); Patrick Towa, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 16/423,698

(22) Filed: May 28, 2019

(65) Prior Publication Data
US 2020/0382287 A1    Dec. 3, 2020

(51) Int. Cl.
*H04L 9/32* (2006.01)
*H04L 9/08* (2006.01)
(Continued)

(52) U.S. Cl.
CPC .......... *H04L 9/3218* (2013.01); *G06Q 20/36* (2013.01); *H04L 9/0618* (2013.01);
(Continued)

(58) Field of Classification Search
CPC ..... H04L 9/3218; H04L 9/0656; H04L 9/088; H04L 9/0894; H04L 9/3073; H04L 9/3247; H04L 63/045
See application file for complete search history.

(56) References Cited

U.S. PATENT DOCUMENTS 11,032,068 B2 *   6/2021  Camenisch ........... H04L 9/3218
2014/0075199 A1   3/2014  Hiwatari et al.
(Continued)

FOREIGN PATENT DOCUMENTS

CN     108063754 A     5/2018
WO     2009110107 A1   9/2009

OTHER PUBLICATIONS

Kiayias and Tang. "How to Keep a Secret: Leakage Deterring Public-key Cryptosystems". ACM CCS 13, Nov. 2013, ACM Press. pp. 943-954 (Year: 2013).*
(Continued)

*Primary Examiner* — Zachary A. Davis
(74) *Attorney, Agent, or Firm* — Harrington & Smith

(57) ABSTRACT

Privacy-preserving leakage-deterring public-key encryption techniques are provided. A sender system sends to an authority system a commitment to leakage-deterring-data, and proves in zero-knowledge that the sender system has access to an opening to the commitment. The sender system receives a signature corresponding to a signed commitment to the leakage-deterring-data and an identifier of the sender system. The sender system encrypts a message to a receiver system by applying a one-time pad to the message using a one-time-pad key, and encrypts the result of the application with the public key of the receiver system. The sender system encrypts the one-time-pad key with an attribute-based encryption scheme with a public key of an oblivious decryptor system. The sender system forms a ciphertext from a combination of the encrypted message and the encrypted one-time-pad key and sends the ciphertext to the receiver system.

15 Claims, 7 Drawing Sheets

(51) Int. Cl.
    *H04L 9/06*        (2006.01)
    *G06Q 20/36*     (2012.01)
    *H04L 9/30*        (2006.01)
    *H04L 9/40*        (2022.01)
    *H04L 9/00*        (2022.01)

(52) U.S. Cl.
    CPC ............ *H04L 9/0656* (2013.01); *H04L 9/088* (2013.01); *H04L 9/0825* (2013.01); *H04L 9/0894* (2013.01); *H04L 9/3073* (2013.01); *H04L 9/3247* (2013.01); *H04L 63/045* (2013.01); *H04L 9/50* (2022.05); *H04L 2209/56* (2013.01); *H04L 2209/606* (2013.01)

(56) References Cited

U.S. PATENT DOCUMENTS

2014/0351950 A1    11/2014    Sakemi et al.
2020/0007318 A1    1/2020    Camenisch et al.

OTHER PUBLICATIONS

Kiayias and Tang. "Traitor Deterring Schemes: Using Bitcoin as Collateral for Digital Content". ACM CCS 15, Oct. 2015, ACM Press. pp. 231-242 (Year: 2015).*

Changji Wang and Jianfa Luo "An Efficient Key-Policy Attribute-Based Encryption Scheme with Constant Ciphertext Length" Mathematical Problems in Engineering, vol. 2013, Article ID 810969 [retrieved Jun. 14, 2018].

Aggelos Kiayias and Qiang Tang "How to Keep a Secret: Leakage Deterring Public-Key Cryptosystems" University of Edinburgh [retrieved Apr. 1, 2019].

Camenisch, Jan, et al., "Efficient Fully Secure Leakage-Deterring Encryption", IACR Cryptol. ePrint Arch, 2019: 1472, 35 pages.

Bethencourt, Sahai, and Water, "Ciphertext-Policy Attribute-Based Encryption", 2007 IEEE Symposium on Security and Privacy (SP '87), 15 pages.

Goyal, Vipul, et al., "Attribute-Based Encryption for Fine-Grained Access Control of Encrypted Data", CCS'06, Oct. 30-Nov. 3, 2006, pp. 89-98.

Bethencourt, John, et al., "Ciphertext-Policy Attribute-Based Encryption", 2007 IEEE Symposium on Security and Privacy (SP'07), Jan. 2007.

Lewko, Allison, "Tools for Simulating Features of Composite Order Bilinear Groups in the Prime Order Setting", Cryptology ePrint Archive, Report 2011/490, EUROCRYPT 2012, INCS 7237, pp. 318-335, International Association for Cryptologic Research 2012.

Gordon, Dov "ISA 562: Information Security, Theory and Practice, Lecture 2", downloaded from https://cs.gmu.edu > ~gordon > teaching > isa562 > notes > lecture_2.pdf, 2017, 8 pages.

Alin Tomescu, "CPA and CCA security", CSE408, Tuesday, Mar. 3, Lecture #10 (Mar. 2011), downloaded from https://people.csail.mit.edu > alinush > cse508-spring-2011 > 03-03-cpa-and-cca.pdf, 4 pages.

Tatsuaki Okamoto and Katsuyuki Takashima, "Fully Secure Functional Encryption with General Relations from the Decisional Linear Assumption", T. Rabin (Ed.), Crypto 2010, LNCS 6223, pp. 191-208, 2010.

* cited by examiner

200

```
┌─────────────────────────────────────────────┐
│ 202   encrypting the receiver system id     │
└─────────────────────────────────────────────┘
                      ↓
┌─────────────────────────────────────────────┐
│ 204   sending predefined time to oblivious  │
│       decryptor                             │
└─────────────────────────────────────────────┘
                      ↓
┌─────────────────────────────────────────────┐
│ 206   proving in zero-knowledge ....        │
└─────────────────────────────────────────────┘
                      ↓
┌─────────────────────────────────────────────┐
│ 208   receiving data enabling the receiver to│
│       recover the secret key                │
└─────────────────────────────────────────────┘
                      ↓
┌─────────────────────────────────────────────┐
│ 210   storing the secret key of the oblivious│
│       decryptor and the receiver system identifier│
└─────────────────────────────────────────────┘
                      ↓
┌─────────────────────────────────────────────┐
│ 212   recovering the secret key of the oblivious│
│       decryptor                             │
└─────────────────────────────────────────────┘
                      ↓
┌─────────────────────────────────────────────┐
│ 214   decrypting the encrypted one-time pad │
└─────────────────────────────────────────────┘
                      ↓
┌─────────────────────────────────────────────┐
│ 216   decrypting the message to which the one-│
│       time-pad was applied                  │
└─────────────────────────────────────────────┘
                      ↓
┌─────────────────────────────────────────────┐
│ 218   re-applying the one-time pad key to the│
│       message and re-establish original message│
└─────────────────────────────────────────────┘
```

FIG. 2

PRIVACY-PRESERVING LEAKAGE-DETERRING PUBLIC-KEY ENCRYPTION FROM ATTRIBUTE-BASED ENCRYPTIONS

FIELD OF THE INVENTION

The invention relates generally to a method for encrypting messages to avoid non-allowed access, and more specifically, to a computer-implemented method for privacy-preserving leakage-deterring public-key encryption. The invention relates further to a related time-based leakage-deterring encryption system for privacy-preserving leakage-deterring public-key encryption, and a computer program product.

BACKGROUND

Data protection remains a hot topic for IT (information technology) executives. Not only protecting enterprise data in enterprise or cloud storage systems, but also protecting messages between enterprises or from employee to employee within one company continues to be a high ranked issue. Preventing leakage of sensitive information, such as private keys, is at the heart of traitor-tracing schemes, leakage-deterring schemes and generalizations thereof. The design is concerned, inter alia, with the case of a symmetric encryption schemes and considers the scenario in which (here adversarial and possibly colluding) users produce and share implementations capable of decrypting ciphertexts generated with those public keys.

Traitor-tracing schemes aim to identify users at fault so as to apply sanctions, whereas leakage-deterring ones aim at dissuading users from misbehavior by safely embedding some leakage-deterring-information in the public keys such that any, even particularly functional, decryption implementation would be revealed. Prior art solutions adapting the second approach require, however, revealing the leakage-deterring-information by an authority. The attempts have been made to circumvent this weak edge. However, the drawback of such tried out constructions is that every decryption requires communication with an oblivious online party, which might be prohibitive in certain cases.

Therefore, providing a more efficient and less communication-intensive solution while preserving strongly the security guarantees still remains an open problem.

SUMMARY

An exemplary embodiment is a method, comprising sending, from a sender system, which has access to leakage-deterring-data, to an authority system, a commitment to the leakage-deterring-data. The method includes proving in zero-knowledge, by the sender system to the authority system, that the sender system has access to an opening to the commitment. The method includes receiving, at the sender system and from the authority system, a signature corresponding to a signed commitment to the leakage-deterring-data of the sender system and an identifier of the sender system. The method further includes encrypting a message from the sender system to a receiver system by applying a one-time pad to the message using a one-time-pad key, and encrypting the result of the one-time pad applied to the message with the public key of the receiver system. The method additionally includes encrypting by the sender system the one-time-pad key with an attribute-based encryption scheme, for which the attributes are predefined time period data and a receiver system identifier related to the receiver system, with a public key of an oblivious decryptor system. The method also includes forming by the sender system a ciphertext from a combination of the encrypted message and the encrypting one-time-pad key, and sending by the sender system the formed ciphertext to the receiver system.

In another exemplary embodiment, an apparatus is disclosed that includes at least one memory having computer readable code thereon, and at least one processor. The at least one processor causes, in response to retrieval and execution of the computer readable code, the apparatus to perform operations comprising: sending, from a sender system, which has access to leakage-deterring-data, to an authority system, a commitment to the leakage-deterring-data, proving in zero-knowledge, by the sender system to the authority system, that the sender system has access to an opening to the commitment, receiving, at the sender system and from the authority system, a signature corresponding to a signed commitment to the leakage-deterring-data of the sender system and an identifier of the sender system, encrypting a message from the sender system to a receiver system by applying a one-time pad to the message using a one-time-pad key, encrypting the result of the one-time pad applied to the message with the public key of the receiver system, encrypting by the sender system the one-time-pad key with an attribute-based encryption scheme, for which the attributes are predefined time period data and a receiver system identifier related to the receiver system, with a public key of an oblivious decryptor system, forming by the sender system a ciphertext from a combination of the encrypted message and the encrypted one-time-pad key, and sending by the sender system the formed ciphertext to the receiver system.

In another exemplary embodiment, a computer program product is disclosed that comprises a computer readable storage medium having program instructions embodied therewith. The program instructions are executable by an apparatus to cause the apparatus to perform operations comprising: sending, from a sender system, which has access to leakage-deterring-data, to an authority system, a commitment to the leakage-deterring-data, proving in zero-knowledge, by the sender system to the authority system, that the sender system has access to an opening to the commitment, receiving, at the sender system and from the authority system, a signature corresponding to a signed commitment to the leakage-deterring-data of the sender system and an identifier of the sender system, encrypting a message from the sender system to a receiver system by applying a one-time pad to the message using a one-time-pad key, encrypting the result of the one-time pad applied to the message with the public key of the receiver system, encrypting by the sender system the one-time-pad key with an attribute-based encryption scheme, for which the attributes are predefined time period data and a receiver system identifier related to the receiver system, with a public key of an oblivious decryptor system, forming by the sender system a ciphertext from a combination of the encrypted message and the encrypting one-time-pad key, and sending by the sender system the formed ciphertext to the receiver system.

BRIEF DESCRIPTION OF THE SEVERAL VIEWS OF THE DRAWINGS

Preferred embodiments of the invention will be described, by way of example only, and with reference to the following drawings:

FIG. 2 shows a block diagram of a flowchart of an embodiment of the decryption portion of the method.

DETAILED DESCRIPTION

Figure 1:
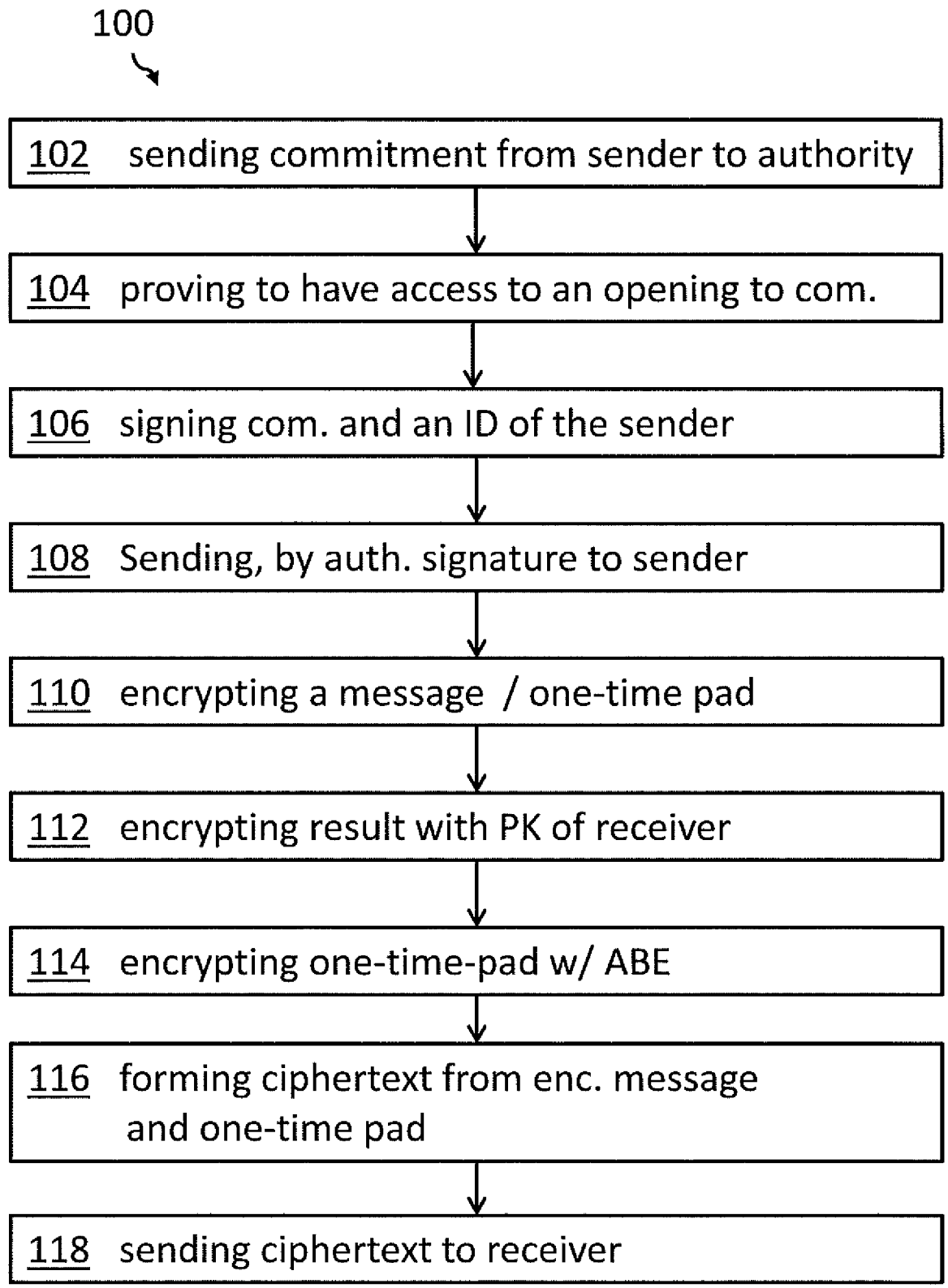
FIG. 1 shows a block diagram of an embodiment of the inventive computer-implemented method for privacy-preserving leakage-deterring public-key encryption.

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

According to one aspect of the present invention, a computer-implemented method for privacy-preserving leakage-deterring public-key encryption may be provided. The method may comprise sending, from a sender system, which may have access to leakage-deterring-data, to an authority system, a commitment to the leakage-deterring-data, proving in zero knowledge, by the sender system to the authority system, that the sender system may have access to an opening to the commitment, signing, by the authority system, the commitment to the leakage-deterring-data of the sender system and an identifier of the sender system building a signature, and sending, by the authority system, the signature to the sender system.

Moreover, the method may comprise encrypting a message from the sender system to a receiver system by applying a one-time pad to the message using a one-time-pad key, encrypting the result of the one-time pad applied to the message with the public key of the receiver system, encrypting the one-time-pad key with an attribute-based encryption (ABE) scheme, for which the attributes are a predefined time period data and a receiver system identifier related to the receiver system, with a public key of an oblivious decryptor system, and forming a ciphertext from a combination of the encrypted message and the encrypting one-time-pad key.

According to another aspect of the present invention, a time-based leakage-deterring encryption system for privacy-preserving leakage-deterring public-key encryption may be provided. The system may comprise a first sending unit adapted for sending, from a sender system, which has access to leakage-deterring-data, to an authority system, a commitment to the leakage-deterring-data, wherein the sending unit is also adapted for proving in zero knowledge, by the sender system to the authority system, that the sender system has access to an opening to the commitment, a signature unit adapted for signing, by the authority system, the commitment to the leakage-deterring-data of the sender system and an identifier of the sender system building a signature, and a second sending unit sending, by the authority system, the signature to the sender system.

The system may also comprise a first encryption module adapted for encrypting a message from the sender system to a receiver system by applying a one-time pad to the message using a one-time-pad key, wherein the first encryption module is also adapted for encrypting the result of the one-time pad applied to the message with the public key of the receiver system, and a second encryption module adapted for encrypting the one-time-pad key with an attribute-based encryption scheme, for which the attributes are predefined time period data and a receiver system identifier related to the receiver system, with a public key of an oblivious decryptor system, and wherein the second encryption module is also adapted for forming a ciphertext from a combination of the encrypted message and the encrypting one-time-pad key.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

The aspects defined above, and further aspects of the present invention, are apparent from the examples of embodiments to be described hereinafter and are explained with reference to the examples of embodiments, but to which the invention is not limited.

In the context of this description, the following conventions, terms and/or expressions may be used:

The term 'privacy-preserving leakage-deterring public-key encryption' may denote a sort of encryption allowing a preservation of privacy or secrecy of a transmitted message and/or other data and at the same time prevent somebody from letting confidential information—e.g., like company encryption keys—leak outside the company. Even if a complete prevention is not possible, employees may at least be deterred trying to let sensitive information (e.g., company confidential information) leak outside. The method may make intensive use of public/private key pairs.

The term 'sender system' may denote a computer system operated by a user for sending a message to a receiver system. Typical communication technologies may be used. The terms 'sender system' and 'sender' may be seen as equivalent. The same may apply to term 'receiver system' 'receiver'.

The term 'leakage-deterring-data' denotes data that would deter a user from sharing confidential or otherwise sensitive information outside. leakage-deterring-data can be any data that the user will be deterred from actively publishing.

Thereby, the undesired sharing of the confidential information is prevented, and there is no need to try and trace the source of the shared confidential information in retrospect. In other words, the combining of the confidential information with the leakage-deterring-data, results in the keeping of both as confidential, and preventing leakage. Leakage-deterring-data can include, for example, data serving to readily identify the user as the source of leakage, data serving to readily identify the leaked data as confidential information of the organization, data related to the user, and the like. Leakage-deterring-data may be for example, the role description of the employee within the organization or other data that would allow the organization to determine who was the user that was responsible for the leaked information (and possibly only certain individuals or functionaries within the organization to identify the leaking user, thereby preserving user privacy beyond those who need to know). This way, the user may be deterred from sharing sensitive, confidential and/or, in some case, private information of the organization, knowing that she will be revealed as the source of the leak.

The term 'authority system' may denote a trusted organization operating computer system enabled to verify, e.g., identifiers of users or sign messages. The term may be used exchangeable with 'authority'.

The term 'commitment' in particular a commitment scheme should be interpreted as a cryptographic primitive that may allow one to commit to a chosen value (or chosen statement) while keeping it hidden to others with the ability to reveal the committed value later. Commitment schemes are typically designed so that a party cannot change the value or statement after they have committed to it: that is, commitment schemes are binding. Commitment schemes have important applications in a number of cryptographic protocols including secure coin flipping, zero-knowledge proofs, and secure computation.

A way to visualize a commitment scheme is to think of a sender as putting a message in a locked box, and giving the box to a receiver. The message in the box is hidden from the receiver, who cannot open the lock himself. Since the receiver has the box, the message inside cannot be changed. Instead, the message will be revealed when the sender chooses to give him the key at some later time.

Interactions in a commitment scheme may take place in two phases:

1. the commit phase during which a value is chosen and specified, 2. the reveal phase during which the value is revealed and checked.

In simple protocols, the commit phase may consist of a single message from the sender to the receiver. This message is called the commitment. It is essential that the specific value chosen cannot be known by the receiver at that time (this is called the hiding property). A simple reveal phase would consist of a single message, the opening, from the sender to the receiver, followed by a check performed by the receiver. The value chosen during the commit phase must be the only one that the sender can compute and that validates during the reveal phase (this is denoted the binding property).

The term 'zero-knowledge'—or in other words zero-knowledge proof—may denote a method by which one party (the prover) can prove to another party (the verifier) that they know a value x, without conveying any information apart from the fact that they know the value x. The essence of zero-knowledge proofs is that it is trivial to prove that one possesses knowledge of certain information by simply revealing the information; the challenge is to prove such possession without revealing the information itself or any additional information.

The term 'opening' may be interpreted in the context of the above-discussed commitment scheme. A simple reveal phase would consist of a single message, the opening from the sender to the receiver, followed by a check performed by the receiver. The value chosen during the commit phase must be the only one that the sender can compute and that validates during the reveal phase (this is called the binding property).

The term 'message' may denote any electronic information conveyed and/or transmitted from a sender system to a receiver system. The message may come in text form, as a voice message, as a video sequence and/or as an image and/or any other form of binary information.

The proposed computer-implemented method for privacy-preserving leakage-deterring public-key encryption may offer multiple advantages and technical effects:

A highly secure communication method is proposed in which the involvement of an authority and an oblivious decryptor is reduced to a minimum. The here proposed privacy-preserving solution may require only little computational overhead and may represent a communication efficient way to securely transfer data from a sender to a receiver. The solution even may stay functional and the presence of a malevolent authority in a multi-owner setting. A commitment scheme is used to guarantee the privacy or secrecy of the owner information and of an utterly oblivious third party for decryption. After generating keys for a standard cryptosystem, the owner sends a commitment to those leakage-deterring-data to the authority and proves in zero-knowledge that he knows an opening to the commitment.

The authority then appends the commitment to the owner's public key. To encrypt a message, a one-time pad is applied to the message, the result is encrypted with the owner's public key, and the one-time-pad key may be encrypted with a secure scheme with a third party's public key and labelled with a re-randomization of the commitment to the owners' leakage-deterring-data. The randomness used to compute the label is included in the ciphertext.

To encrypt a message from the sender system to a receiver system a one-time pad is applied to the message using a one-time-pad key, and the one-time-pad key is encrypted with an attribute-based encryption scheme, for which the attributes are a predefined time period data and a receiver system identifier with a public key of an oblivious decryptor system. The ciphertext is formed from a combination of the encrypted message and the encrypting one-time-pad key.

On the other side, for the decryption of the ciphertext, the owner simply sends to the third-party the part encrypted with a third party's public key and the label, and proves in zero-knowledge that he possesses a commitment and a randomness that can be used to compute the label, as well as an opening to the mentioned commitment. If the proof succeeds, the third-party decrypts the ciphertext the third-party was given and sends the resulting one-time-pad key to the owner, who can then compute the plaintext.

Thus, the computation and communication overhead is pretty limited. The communication allows for the recovery of the opening containing the owner secret in case of functional implementation of a decryption algorithm being available, provided that the functional implementation of the algorithm can be rewound in a black-box manner.

The proposed secure message transfer schema deters a user from sharing a private decryption module. It may, e.g., be used successfully by a payment-service provider or by a company to prevent employees from spreading confidential information because the leaking employees may be identifiable by the company so that the employee may face personal consequences. Additionally, the proposed concept may allow to enterprises to be better in compliance with data security and data privacy laws and regulations. By being instrumented to clearly identify individuals responsible for making private and/or confidential data available to an unauthorized 3rd party, the moral barrier for a non-allowed leakage of company internal or otherwise secret data may be increased.

In the following, additional embodiments of the method—also applicable to the related system will be described:

According to an embodiment of the method, the leakage-deterring-data may be access credentials to a crypto-currency wallet. Also other valuable information may be used that may represent a sort of punishment to somebody making his company security keys known to non-allowed third parties. This may prevent that users make enterprise safety keys known to other users without having the security authority.

According to one embodiment of the method, the identifier of the sender system and the identifier of the second system may be each a unique authority system guaranteed label of the related system. This way, the involved systems and the communication channel are defined and guaranteed entities and an enterprise communication process with a comparably high level of trust.

According to one example embodiment of the method, the public key of the sender system may be a public portion of a public-private key pair. This way, a known and proven method may be used for a sub step of the overarching here proposed method.

According to another example of an embodiment of the method, a communication between the sender system and the authority system may use a secure channel. This way, it may be guaranteed—as good as possible and with limited effort—that the transferring of data may be as resistant as possible to overhearing and tampering.

According to a further embodiment, the method may also comprise: upon receiving the ciphertext by the receiver system a first time, encrypting the receiver system identifier, sending, by the receiver system to the oblivious decryptor, the predefined time period data and an encrypted receiver system identifier, proving in zero-knowledge, by the receiver system to the oblivious decryptor system, that the receiver system has access to a signature from the authority system on the receiver system identifier and on the commitment to the leakage-deterring-data of the receiver system, and receiving, by the receiver system from the oblivious decryptor system, data enabling the receiver system to recover the private key of the oblivious decryptor system, related to the oblivious public key, for the predefined time period data and the receiver system identifier, and storing, by the receiver system, the private key of the oblivious decryptor system for the predefined time period data and the receiver system identifier.

This portion of the method may represent the initiation of a decryption process within the defined period of time. Further steps in the decryption of a received encrypted message may be described by the next embodiment.

According to another possible embodiment, the method may comprise: upon receiving the ciphertext a second time—as well as upon all subsequent receptions—in the time period specified by the predefined time period data, recover, by the receiver system, the private key of the oblivious decryptor system for the predefined time period data and the receiver system identifier.

Thus, while the initiation of the decryption of the encrypted receipt messages may represent a little bit more effort, subsequent receptions of messages encrypted in the same way and within the same time window require only little overhead while preserving the same level of security. Further communication with the oblivious decryptor is no longer required.

According to one additional embodiment, the method may also comprise decrypting, by the receiver system, the encrypted one-time-pad key with the private key of the oblivious decryptor system for the time period data and the receiver system identifier, decrypting, by the receiver system, with a private key of the receiver system related to the public key of the receiver system, the message to which a one-time-pad was applied, and re-applying, by the receiver system, the one-time-pad key to the message to which the one-time-pad was applied in order to re-establish the message encrypted by the sender system.

All of these steps may be performed transparent to a user. Hence, a high level of communication security may be achieved with a need to communicate with an oblivious decryptor only during the setup phase of the encryption process.

Before the figures will be described in detail, the theoretical foundation of the time-based leakage-deterring encryption (TBLDE) should be described at least partially:

Let $\mathcal{T}$ be a set of natural integers, and $\mathcal{ID}$ a non-empty identity set. It may be assumed that all parties are synchronized. Consider $\mathcal{C}$ a commitment scheme (with a proof system (ComP, ComV) for relation $\mathcal{RC}$, e.g., $R_C=\{(c,s,o):$ Open $(ck,c,s,o)=1\})$, $\mathcal{E}_0$ a public-key encryption scheme, $\mathcal{E}_1$ a CPABE (cyphertext-policy attribute-based encryption) with attribute space $\mathcal{T} \cup \mathcal{ID}$ and equality as access policy, $\mathcal{E}_2$ a public-key encryption scheme with message space $\mathcal{ID}$, and $\mathcal{S}$ a signature scheme. Suppose that $\mathcal{E}_0$ and $\mathcal{E}_1$ share the same message space $\mathcal{M}$, on which there exists an internal composition law $\oplus$ such that for all $m \in \mathcal{M}$, the "map·$\oplus$m" is a permutation of $\mathcal{M}$. Let "·$\ominus$m" stand for its inverse. Let $\mathcal{E}$ be a TBLDE scheme parametrized by time-period set $\mathcal{T}$ and identity set $\mathcal{ID}$ such that the following are implemented:

Setup $(1^{\mathcal{K}}, (\mathcal{T}, \mathcal{ID})) \rightarrow (\mathcal{PP}, ck)$: generates (this supposes a coherence of the mathematical structures generated by these various setup algorithms) public parameters by running algorithms $\varepsilon_0$.Setup $(1^{\mathcal{K}})$, $\varepsilon_1$.Setup $(1^{\mathcal{K}}, (\mathcal{T}, \mathcal{ID}))$, C.Setup $(1^{\mathcal{K}})$, $\mathcal{S}$.Setup $(1^{\mathcal{K}})$, and computes a commitment key ck←ComKeyGen ($\mathcal{PP}$);

UKeyGen ($\mathcal{PP}$ $\mathcal{PP}$)→(pk $_{\mathcal{U}}$, sk $_{\mathcal{U}}$): runs $\varepsilon_0$.KeyGen ($\mathcal{PP}$);

TKeyGen ($\mathcal{PP}$)→(pk$\mathcal{T}$, sk$\mathcal{T}$): computes (pk, msk) ←$\varepsilon_1$.KeyGen ($\mathcal{PP}$), and sets pk$\mathcal{T}$=pk, sk$\mathcal{T}$=msk;

KeyEn (ck, c, s, o, pk $_{\mathcal{U}}$, sk $_{\mathcal{U}}$)→((epk, esk), epk): is a protocol involving UKeyEn and TKeyEn, which proceed as follows:

1. UKeyEn (ck, c, s, o, pk $_{\mathcal{U}}$, sk $_{\mathcal{U}}$) and AKeyEn (ck, c, pk $_{\mathcal{U}}$) run the interactive protocol (ComP (ck, c, s, o), ComV (ck, c)) with respective roles ComP and ComV;

2. if the protocol succeeds, AKeyEn generates (sk, vk)←S.KeyGen ($\mathcal{PP}$), id$\in_R \mathcal{ID}$, computes σ=Sign (sk, (c, id)), sets epk=(pk $_{\mathcal{U}}$, c, id, σ), and sends the latter to UKeyEn, which sets esk=(sk $_{\mathcal{U}}$, c, s, o, id, σ); *otherwise, the overall key-enhancement protocol is aborted, i.e., epk=esk←⊥*;

Enc (epk, pk$\mathcal{T}$, m∈$\mathcal{M}$, t∈$\mathcal{T}$)→ct: generates $m_1 \in_R \mathcal{M}$, sets $m_0 = m \oplus m_1$, and outputs ct=($\varepsilon_0$.Enc (pk $_{\mathcal{U}}$, $m_0$), $\varepsilon_1$.Enc (pk$\mathcal{T}$, $m_1$, S={t, id}));

KeyDer=(UKeyDer (esk, t)), TKeyDer (sk$\mathcal{T}$, ck, vk))→(sk $\mathcal{T}^{t,id}$, ⊥): is a blind two-party interactive equivalent of algorithm $\varepsilon_1$.KeyDer (sk$\mathcal{T}$, {t, id}). Precisely, suppose that there exist probabilistic algorithms $Der_0$ and $Der_2$, and a deterministic algorithm Den such that 1. for all sk$\mathcal{T}$, t, (ek, dk)←$\varepsilon_2$.KeyGen ($\mathcal{PP}$), id, $ct^{id}$←$\varepsilon_2$.Enc (ek, id; r$_{u_s}$), variables (ek, dk, r$_{u_s}$, $Der_0$ (sk$\mathcal{T}$, t, ek, $ct^{id}$)) and (ek, dk, r$_{u_s}$, $Der_2$ (sk$\mathcal{T}^{t,id}$, ek)) have the same distribution; and 2. for all sk$\mathcal{T}$, t, (ek, dk)←$\varepsilon_2$.KeyGen ($\mathcal{PP}$), id, $ct^{id}$←$\varepsilon_2$.Enc (ek, id),
   sk$\mathcal{T}^{t,id}$←$Der_0$(sk$\mathcal{T}$, t, ek, $ct^{id}$), $Der_1$(dk, sk$\mathcal{T}^{t,id}$)=$\varepsilon_1$.KeyDer (sk$\mathcal{T}$, {t, id}).

Moreover, assume the existence of a proof system (P, V) for the language
   (ck, vk, ek, $ct^{id}$): ∃ (c, s, o, id, σ, r$_{u_s}$),
   Open (ck, c, s, o)=1, Verify (vk, (c, id))=1
   $ct^{id}$←$\varepsilon_2$.Enc (ek, id; r$_{u_s}$),
and denote its knowledge extractor by K.

UKeyDer and TKeyDer proceed as follows:
1. UKeyDer generates and stores a pair of keys (ek, dk)←$\varepsilon_2$.KeyGen ($\mathcal{PP}$) if none was previously stored, and otherwise reuses such a pair, computes $ct^{id}$=$\varepsilon_2$.Enc (ek, id; r$_{u_s}$), and sends (ek, t, $ct^{id}$) to TKeyDer;
2. algorithms UKeyDer and TKeyDer run protocol (P, V) with respective roles P and V; and
3. should the protocol succeed, TKeyDer computes sk$\mathcal{T}^{t,id}$←$Der_0$ (sk$\mathcal{T}$, t, ek, $ct^{id}$), and sends it to UKeyDer. Finally, UKeyDer outputs sk$\mathcal{T}^{t,id}$=Der1 (dk, sk$\mathcal{T}^{t,id}$). If protocol (P, V) fails, the overall protocol is aborted, i.e., sk$\mathcal{T}^{t,id}$←⊥.

Dec (esk, ct)→m: parses ct as ($ct_0$, $ct_1$=($ct'_1$, t)) (outputs ⊥ if et cannot be parsed as such). If a third-party private key sk$\mathcal{T}^t$ for time period t was not priorly obtained (assuming the decryption algorithm to be stateful), it engages in the KeyDer protocol (running UKeyDer as a subroutine) with the third party. If the protocol succeeds and Dec acquires a third-party private key sk$\mathcal{T}^t$, or if a key sk$\mathcal{T}^t$ was already stored, Dec outputs m=$\varepsilon_0$.Dec (sk, $ct_0$)⊕1.Dec (sk$\mathcal{T}^t$, $ct_1$) (outputs ⊥ instead if either $\varepsilon_0$.Dec (sk, $ct_0$)=⊥ or $\varepsilon_1$.Dec (sk$\mathcal{T}^t$, $ct_1$)=⊥);
and Rec (B, epk, pk$\mathcal{T}$, $\mathcal{D}$, t)→s: generates messages m←$_s\mathcal{D}$, and submits the corresponding ciphertexts Enc (epk, pk$\mathcal{T}$, m, t) to B until the latter engages in protocol (P, V) with role P and succeeds in it. Once this event occurs (it is yet to be proved that it does indeed occur), algorithm Rec runs knowledge extractor $\mathcal{K}$, which can rewind prover P (here B), to extract a witness that contains a secret s, to which c is a commitment.

Theorem 4.1. ε is correct if $\varepsilon_0$ and $\varepsilon_1$ are correct and if (P, V) is complete.

Proof: If (P, V) is complete, then, for a given ciphertext, UKeyDer successfully obtains a private key corresponding to the time period indicated by the access structure of the said ciphertext. The correctness of $\varepsilon_0$ and $\varepsilon_1$ then implies that of ε.

Theorem 4.2. E satisfies privacy if $\mathcal{C}$ is hiding, protocols (ComP, ComV) and (P, V) are zero-knowledge, and $\varepsilon_2$ is IND-CPA secure.

Proof: Let A be an adversary for the privacy distinction experiment. Consider an algorithm S, which interacts with A and a commitment-scheme hiding-experiment challenger $C_\beta$ that always commits to $s_\beta$ for $_\beta \in \{0\ 1\}$. Alter receiving a commitment key ck from $C_\beta$, algorithm S, runs ε.Setup (1$^\mathcal{K}$), and generates a pair of keys (pk$_{u_s}$, sk$_{u_s}$). Algorithm S, then sends (ck, pk$_{u_s}$) to A. Upon reception of a pair ($s_0$, $s_1$) from A, algorithm S forwards it to C, and gets back c, a commitment to sg. Algorithm S sends c to A, and simulates, in protocol KeyEn, a proof of knowledge of a secret and of an opening to c by calling on the simulator of proof system (ComP, ComV). Thereafter, whenever A issues a decryption query, algorithm S, in the KeyDer derivation protocol, generates a pair of keys (ek, dk)←$\varepsilon_2$.KeyGen ($\mathcal{PP}$) and an identity id'$\in_R \mathcal{ID}$, computes $ct^{id'}$=$\varepsilon_2$.Enc (ek, id'), and sends ek, t and $ct^{id'}$ to A. It then simulates a proof of knowledge using the simulator of proof system (P, V). Algorithm S ultimately forwards the decision bit of A to $C_\beta$.

$|Pr[\text{Exp}^{priv-0}_{\varepsilon,}\mathcal{K}(A)=1] - Pr[\text{Exp}^{priv-1}_{\varepsilon,}\mathcal{K}(A)=1]| \le |Pr[\text{Exp}^{priv-0}_{\varepsilon,}\mathcal{K}(A)=1] - Pr[\text{Exp}^{commit-0}\mathcal{C}_{,}\mathcal{K}(S(A))=1]| + |Pr[\text{Exp}^{commit-1}\mathcal{C}_{,}\mathcal{K}(S(A))=1] - Pr[\text{Exp}^{commit-1}\mathcal{C}_{,}\mathcal{K}(S(A))=1]| + |Pr[\text{Exp}^{commit-1}\mathcal{C}_{,}\mathcal{K}(S(A))=1] - Pr[\text{Exp}^{priv-1}_{\varepsilon,}\mathcal{K}(A)=1]|$ The first and third terms are negligible if proof systems (ComP, ComV) and (P, V) are (perfectly) ZK (zero knowledge), and if $\varepsilon_2$ is IND-CPA secure. The second term is negligible (or rather nil) if $\mathcal{C}$ is (perfectly) hiding.

Theorem 4.3. ε is LD-IND-CCA secure if $\varepsilon_0$ is IND-CCA secure.

Proof: The IND-CCA security of can be reduced to the LD-IND-CCA security of $\varepsilon_0$. Indeed, if A is an adversary for the LD-IND-CCA security game, consider San algorithm which interacts with A and the challenger C of the IND-CCA security game. Upon reception of a public key pk$_{u_s}$ from C, algorithm S generates a commitment key ck, and forwards pk$_{u_s}$ and ck to A. When A sends a commitment, a secret s and an opening o to S, the latter runs UKeyEn (ck, c, s, pk$_{u_s}$, ⊥). If the protocol terminates, the enhanced public key of S is set to (pk$_{u_s}$, c, id, σ) for an identity id and a signature σ generated by A. Afterwards, whenever A request the decryption of a ciphertext, S forwards its first part to C, and subsequently follows the rest of the decryption process to answer the request. Upon reception of a challenge tuple ($m_0$, $m_1$, t, pk$_T$) from A, algorithm S generates m$\in_R \mathcal{M}$, sends (m⊕$m_0$, m⊕$m_1$) to C, gets back a challenge ciphertext ct*, computes $ct_1$=$\varepsilon_1$.Enc (pk$_T$, m, {t, id}), and sends (ct*, $ct_1$) to A. Whenever A request the decryption of a ciphertext ct ($ct_0$, $ct_1$) such that $ct_0 \ne ct^*$, algorithm S forwards $ct_0$ to C, and then follows the rest of the decryption procedure to answer the query. Algorithm S ultimately forwards the guess of A to C. As S perfectly simulated the LD-IND-CCA-game challenger to A, its advantage in the IND-CCA game is at least that of A in the LD-IND-CCA game. If the latter were non-negligible, then so would be former, and the IND-CCA security of $\varepsilon_0$ would be contradicted.

Theorem 4.4. ε satisfies untraceability if proof system (P, V) is zero-knowledge and $\varepsilon_2$ is IND-CPA secure.

Proof: Let $\mathcal{H}$ (1$^\mathcal{K}$) be an algorithm which interacts with an adversary A (1$^\mathcal{K}$) of the traceability experiment. It runs ε.Setup (1$^\mathcal{K}$), and sends the resulting public parameters $\mathcal{PP}$ to A. When A sends a challenge tuple (($epk_0$, $esk_0$), ($epk_1$, $esk_1$), pk$_T$, m, t), algorithm $\mathcal{H}$ simply generates id$\in_R \mathcal{ID}$ and a pair of keys (ek, dk)←$\varepsilon_2$.Setup (1$^\mathcal{K}$).

Whenever A requests the execution of the decryption algorithm, if $\mathcal{H}$ has not yet received a third-party decryption key for time period t from A, it computes $ct^{id}$=$\varepsilon_2$.Enc (ek, id), and sends (ek, t, $ct^{id}$) to A, simulates a proof for relation $ct^{id}$←$\varepsilon_2$.Enc (ek, id; r$_{u_s}$) by running the simulator of (P, V), and proceeds like UKeyDer in the remaining of the protocol; and otherwise does not perform any computation. Since $|Pr[\text{Exp}^{trace-0}_{\varepsilon,\mathcal{K}}(A)=1] - Pr[\text{Exp}^{trace-1}_{\varepsilon,\mathcal{K}}(A)=1]|$ $\leq |Pr[\text{Exp}^{trace-0}_{\varepsilon,\mathcal{K}}(A)=1] - Pr[A(\mathcal{H})=1]| + |Pr[A(\mathcal{H})=1] - Pr[\text{Exp}^{trace-1}_{\varepsilon,\mathcal{K}}(A)=1]|,$ if (P, V) is ZK and $\varepsilon_2$ is IND-CPA secure the upper bound is negligible, and the advantage of A is thus negligible.

Theorem 4.5. $\varepsilon$ satisfies recoverability with respect to the class of distributions $\mathcal{D}$ such that $\delta - \Omega(p(\mathcal{D}))$ is non-negligible assuming C to be binding, S to be one time existentially unforgeable and $\varepsilon_2$ to be adaptively payload hiding against chosen-plaintext attacks.

Proof: It suffices to prove that with a probability close to $\delta$, algorithm B requests the third-party private key corresponding to the time period and the identity for which it is claimed to be $\delta$-correct, and succeeds in the PoK (P, V), when given ciphertexts generated with the said time period and identity, and messages generated with the distribution with respect to which it is $\delta$-correct. As soon as this event occurs, algorithm Rec runs extractor K to extract a secret. Since the commitment and the identity used in the witness for the proof are signed by the key-enhancement authority, algorithm Rec must send, with overwhelming probability, the commitment and an encryption of the identity that are in the user enhanced public key. As the commitment scheme is binding, the extracted secret is therefore the one that was used in the key-enhancement protocol.

To this end, consider the following algorithms that interact with a recoverability-game adversary A, and each of which first proceeds like the recoverability-game challenger, ends up with a user enhanced public key that contains an identity id, and then receives from A an algorithm B claimed to be $\delta$-correct in a time period t with respect to a distribution D.

$H_0$ that generates $m \leftarrow_S \mathcal{D}$, $m_{11} \in_R \mathcal{M}$, submits ciphertext $(\varepsilon_0.\text{Enc}(pk_\mathcal{U}, m \oplus m_1), \varepsilon_1.\text{Enc}(pk_T, m_1, \{t, id\}))$ to B. Whenever B sends a tuple (ek', t', $ct^{id'}$), and then succeeds in protocol (P, V), algorithm $H_0$ computes $sk\mathcal{T}^{t',id'} \leftarrow \text{Der}_0$ (sk $\mathcal{T}$, t', ek', $ct^{id'}$), and sends it to B; and $H_1$ which generates $m \leftarrow_S \mathcal{D}$, $m_1$, $m'_1 \in_R \mathcal{M}$, submits ciphertext $(\varepsilon_0.\text{Enc}(pk_\mathcal{U}, m \oplus m_1), \varepsilon_1.\text{Enc}(pk_T, m'_1, \{t, id\}))$ to B, and then proceeds like $H_0$.

Let E denote the event in which id'=id, and F the event in which B succeeds in protocol (P,V).

Assume Pr [$\bar{F}$] to be non-nil, and observe that $Pr[E \cup F] \leq Pr[\overline{B(\mathcal{H}_\delta} = m)] + Pr[E \cup F) \cap \{B(\mathcal{H}_0) = m\}]$ $\leq Pr[\overline{B(\mathcal{H}_\delta} = m)] + Pr[E \cap F] + Pr[F \cap \{B(\mathcal{H}_0) = m\}] \leq Pr[\overline{B(\mathcal{H}_\delta} = m)] + Pr[E \cap F] + Pr[B(\mathcal{H}_0) = m | \bar{F}].$ (7)

Lemma 4.6. There exists an algorithm S such that $|Pr[B(H_0) = m | \bar{F}] - Pr[B(H_1) = m | \bar{F}]| \leq Adv^{ph-cpa}_{\varepsilon 1, \mathcal{K}}(S).$ Proof: Let S be an algorithm which interacts with A, and attempts to distinguish two game challengers: a challenger $C_0$ that encrypts the first message and a challenger $C_1$ that encrypts the second. After receiving a public key $pk_T$, algorithm S generates a commitment key ck, and sends (ck, $pk_T$) to A. When A sends a pair (s, $pk_\mathcal{U}$), algorithm S computes (c, o)$\leftarrow$Com (ck, s), sends (s, o) to A, and executes the key-enhancement protocol with A, running AKeyEn (ck, c, $pk_\mathcal{U}$) as a subroutine. S obtains an enhanced public key which contains an identity id.

Whenever A requests the execution of TKeyDer ($sk_T$, ck, vk), sends a tuple (ek', t', $ct^{id'}$) and engages in protocol (P, V) with role P, if A succeeds in protocol (P, V), algorithm S runs K, gets a witness that contains an identity id' with overwhelming probability, and queries the private key $sk\mathcal{T}^{t',id'}$ for attribute set {t', id'} to the challenger with which it interacts. Algorithm S then returns $\text{Der}_2$ (sk $\mathcal{T}^{t',id'}$, ek') to A. If A does not succeed in protocol (P, V), algorithm S sends $\bot$ to A. When A sends an algorithm B, a distribution D and a time period t>tc, algorithm S generates $m \leftarrow_S \mathcal{D}$, $m_1$, $m'_1 \in_R \mathcal{M}$, sends ($m_1$, $m'_1$, {t, id}) to the challenger with which it interacts, and gets back a challenge ciphertext ct*. It then submits ($\varepsilon_0.\text{Enc}(pk_\mathcal{U}, m \oplus m_1)$, ct*) to B. When B sends a tuple (ek', t', $ct^{id'}$) (if it does at all), conditioned on event F (i.e., B does not succeed in protocol (P, V)), algorithm S returns $\bot$. Algorithm S eventually outputs 1 if B outputs m, and otherwise (B outputs m'$\neq$m or $\bot$) outputs 0. Note that since t>$t_C$, adversary A cannot have obtained a private key for attribute set {t, id}. Conditioned on $\bar{F}$, in case the challenger is $C_0$, algorithm S perfectly simulates $H_0$ to A. Analogously, if the challenger is $C_1$, algorithm S perfectly simulates $H_1$ to B, hence the claim.

In addition to that, Pr [B ($\mathcal{H}_1$)=m|$\bar{F}$]$\leq p$ ($\mathcal{D}$) as the ciphertext that B receives bears no information about $m_1$. Algorithm Bean therefore only guess m, and it can be done with probability at most ($\mathcal{D}$), the predictive probability of distribution $\mathcal{D}$.

Lemma 4.7. There exists an algorithm S such that $Pr[E \cap F] \leq Adv^{euf-cma}_{S, \mathcal{K}}(S).$ Proof: Let S be an algorithm which interacts with A and the existential-forgeability-game challenger C Upon reception of a verification key vk, algorithm S generates a commitment key ck and third-party pair of keys ($pk_T$, $sk_T$), and sends (ck, $pk_T$) to A. Algorithm S then proceeds like the recoverability-game challenger until the key-enhancement protocol, in which, instead of generating a signature pair of keys, uses vk to sign the commitment and the identity involved in the protocol. It carries on as the Lemma-4.6 simulator until B sends a tuple (ek', t', $ct^{id'}$) and succeeds in protocol (P, V) with role P, which occurs in event $E \cap F$. Algorithm S runs K to extract a witness which contains a commitment c, an identity Id and a signature a such that verify (vk, (c, id), $\sigma$)=1 with overwhelming probability. Algorithm S then sends ((c, id), $\sigma$) to C. As S perfectly simulates the recoverability-game challenger to A conditioned on $E \cap F$, the claim follows.

Remark 4.8: It is enough for S to be a one-time existentially unforgeable signature scheme. Combining the previous lemmata, $Pr[E \cup] \leq Pr[\overline{B(\mathcal{H}_\delta} = m)] + Adv^{euf-cma}_{S, \mathcal{K}}(S) + Adv^{ph-cpa}_{\varepsilon 1, \mathcal{K}}(S) + p(\mathcal{D}) \leq 1 - \delta + Adv^{euf-cma}_{S, \mathcal{K}}(S) + Adv^{ph-cpa}_{\varepsilon 1, \mathcal{K}}(S) + p(\mathcal{D}),$ and thus, setting $\tilde{\delta} = \delta - Adv^{euf-cma}_{S, \mathcal{K}}(S) - Adv^{ph-cpa}_{\varepsilon 1, \mathcal{K}}(S) + p(\mathcal{D})$ $= \delta - \Omega(p(\mathcal{D})),$ it follows that $Pr[E \cap F] \geq \tilde{\delta}.$ If Pr [$\bar{F}$] is nil, the lower-bound still holds.

Algorithm Rec then does the following. It repeatedly submits ciphertexts encrypting messages generated with distribution $\mathcal{D}$. If B engages in protocol (P, V), algorithm Rec plays the role of verifier V. Until the end of the protocol, B cannot tell Rec and TKeyDer apart by definition of the latter. For N such queries, B requests the private key for the time period in which it is claimed to be δ-correct and the identity in the user enhanced public key with probability at least $1-(1-\tilde{\delta})^N$. Performing N such queries for N large enough (e.g., ω (log K)) makes it overwhelming. Once this event occurs, calling on K, which can rewind B, a witness which contains a triple (c, s, o), with c the same as in the enhanced public key, can be recovered with overwhelming probability. Since $\mathcal{C}$ is binding, with overwhelming probability, s is the secret that was given by A during the key-enhancement protocol.

In the following, a detailed description of the figures will be given. All instructions in the figures are schematic. Firstly, a block diagram of an embodiment of the inventive computer-implemented method for privacy-preserving leakage-deterring public-key encryption is given. Afterwards, further embodiments, as well as embodiments of the time-based leakage-deterring encryption system for privacy-preserving leakage-deterring public-key encryption, will be described.

FIG. 1 shows a block diagram of an embodiment of the method 100 for privacy-preserving leakage-deterring public-key encryption. The method 100 comprises sending 102, from a sender system, which has access to leakage-deterring-data, to an authority system, a commitment to the leakage-deterring-data, proving, 104, in zero-knowledge, by the sender system to the authority system, that the sender system has access to an opening to the commitment (com.), and signing, 106, by the authority system, the commitment to the leakage-deterring-data of the sender system and an identifier of the sender system, thereby building a signature (that is, the signing itself builds the signature). The method 100 may further comprise sending, 108, by the authority system, the signature to the sender system. Here the setup phase ends.

Next, the method comprises encrypting, 110, a message from the sender system to a receiver system by applying a one-time pad to the message using a one-time-pad key—in particular using a random key—and encrypting, 112, the result of the one-time pad applied to the message with the public key of the receiver system, encrypting, 114, the one-time-pad key with an ABE scheme, for which the attributes are a predefined time period data—i.e., the epoch—and a receiver system identifier related to the receiver system, with a public key of an oblivious decryptor system, and forming, 116, a ciphertext from a combination of the encrypted (enc.) message and the encrypted one-time-pad key. The sender performs sending, 118, the ciphertext to the receiver.

FIG. 2 shows a block diagram of a flowchart of an embodiment of a method 200 of the decryption portion of the method. Upon receiving the ciphertext by the receiver system a first time, the receiver system performs encrypting, 202, the receive system id (identification) and the predefined time period data and an encrypted receiver system identifier are sent, 204, by the receiver system to the oblivious decryptor (decrypt.), and it is proven, 206, in zero-knowledge, by the receiver system to the oblivious decryptor system, that the receiver system has access to a signature from the authority system on the receiver system identifier and on the commitment to the leakage-deterring-data of the receiver system.

Next, data enabling the receiver system to recover (rec.) the private key of the oblivious decryptor system related to the oblivious public key for the predefined time period data and the receiver system identifier are received, 208, by the receiver system, from the oblivious decryptor (decrypt.) system, and the private key of the oblivious decryptor system for the predefined time period data and the receiver system identifier are stored, 210, by the receiver system.

Upon receiving a (e.g., any or a same) ciphertext a second time in the time period specified by the predefined time period data, the private key of the oblivious decryptor (dec.) system for the predefined time period data and the receiver system identifier is recovered, 212, by the receiver system, and the encrypted one-time-pad key with the private key of the oblivious decryptor system for the time period data and the receiver system identifier are decrypted, 214, by the receiver system.

Last but not least, the message to which a one-time-pad was applied is decrypted, 216, by the receiver system, with a private key of the receiver system related to the public key of the receiver system, and the one-time-pad key is re-applied, 218, by the receiver system, to the message to which the one-time-pad was applied in order to re-establish the message encrypted by the sender system.

Figure 3:
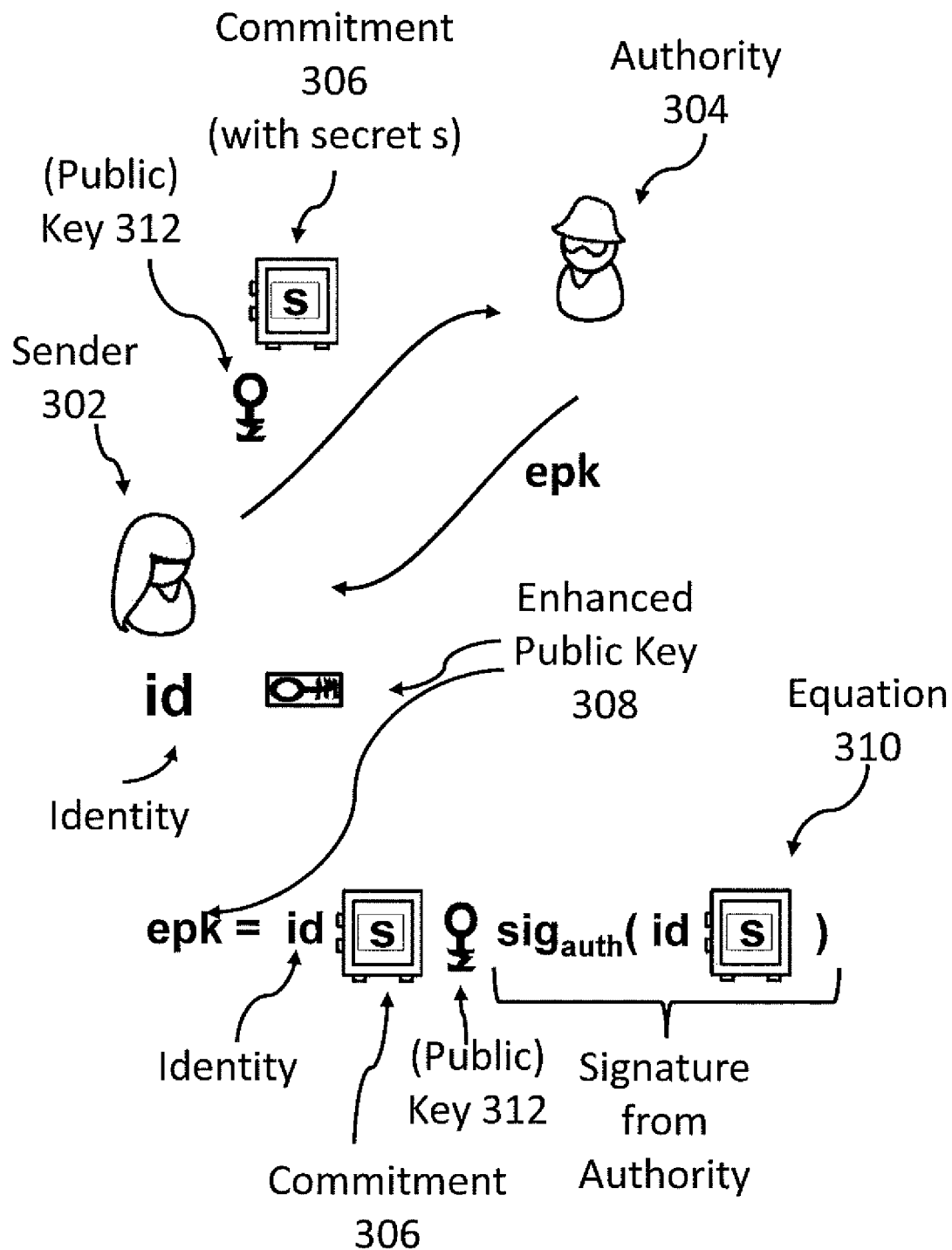
FIG. 3 shows a block diagram of an embodiment of the method visualizing the flow of data between constituents.

FIG. 3 shows a block diagram of an embodiment 300 of the method 100 visualizing the flow of data between constituents. The setup phase of the method 100 is initiated by the sender 302, having an identifier "id" and the authority 304. The commitment 306 with a leakage-deterring-data is sent from the server 302 to the authority 304. The sender proves in zero-knowledge that he knows an opening to the commitment. In return, the authority system 304 signs the commitment to the leakage-deterring-data of the sender system and the identifier "id" of the sender system has enhanced public key (epk) 308. The symbols in the equation 310 show the construction of the enhanced public key. The key 312 represents the public key of the owner for the underlying encryptions scheme, i.e., the one that is being tuned into a leakage deterring one.

It may be noted that the registration protocol hides "s" from the authority 304.

Figure 4:
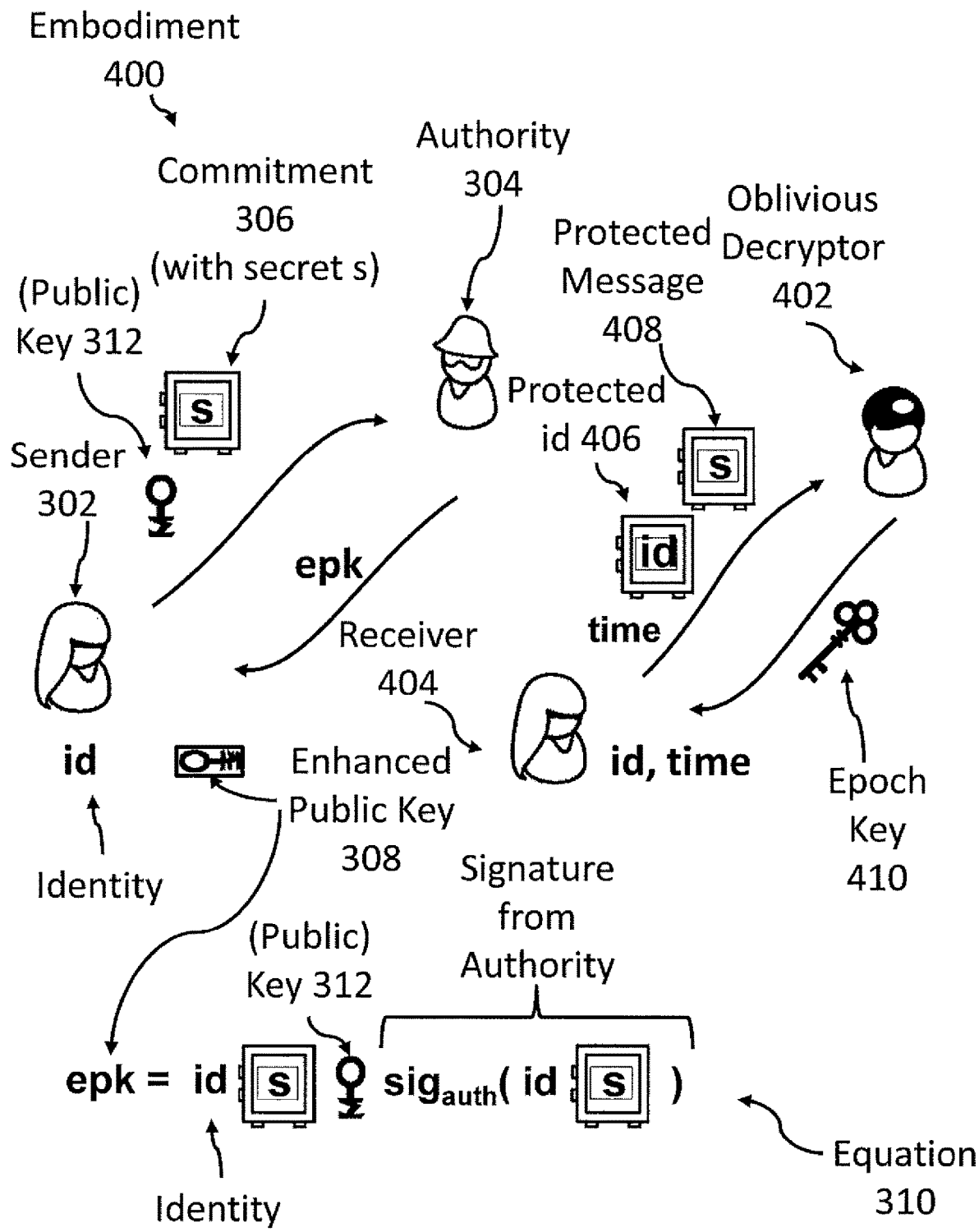
FIG. 4 shows a block diagram of an embodiment of the method visualizing the additional interaction with the oblivious decryptor.

FIG. 4 shows a block diagram 400 of an embodiment of the method 100 visualizing the additional interactions with the oblivious decryptor 402 from FIG. 2. It may be noted that the top left part of the figure is a copy of FIG. 3. The oblivious decryptor is forwarded the received (PGP protected) id 406 of the receiver 404 (compare FIG. 3, 306), and the commitment-protected message 408, as well as a time period "time". The oblivious decryptor generates an epoch key 410 which is only valid during the time period "time".

Figure 5:
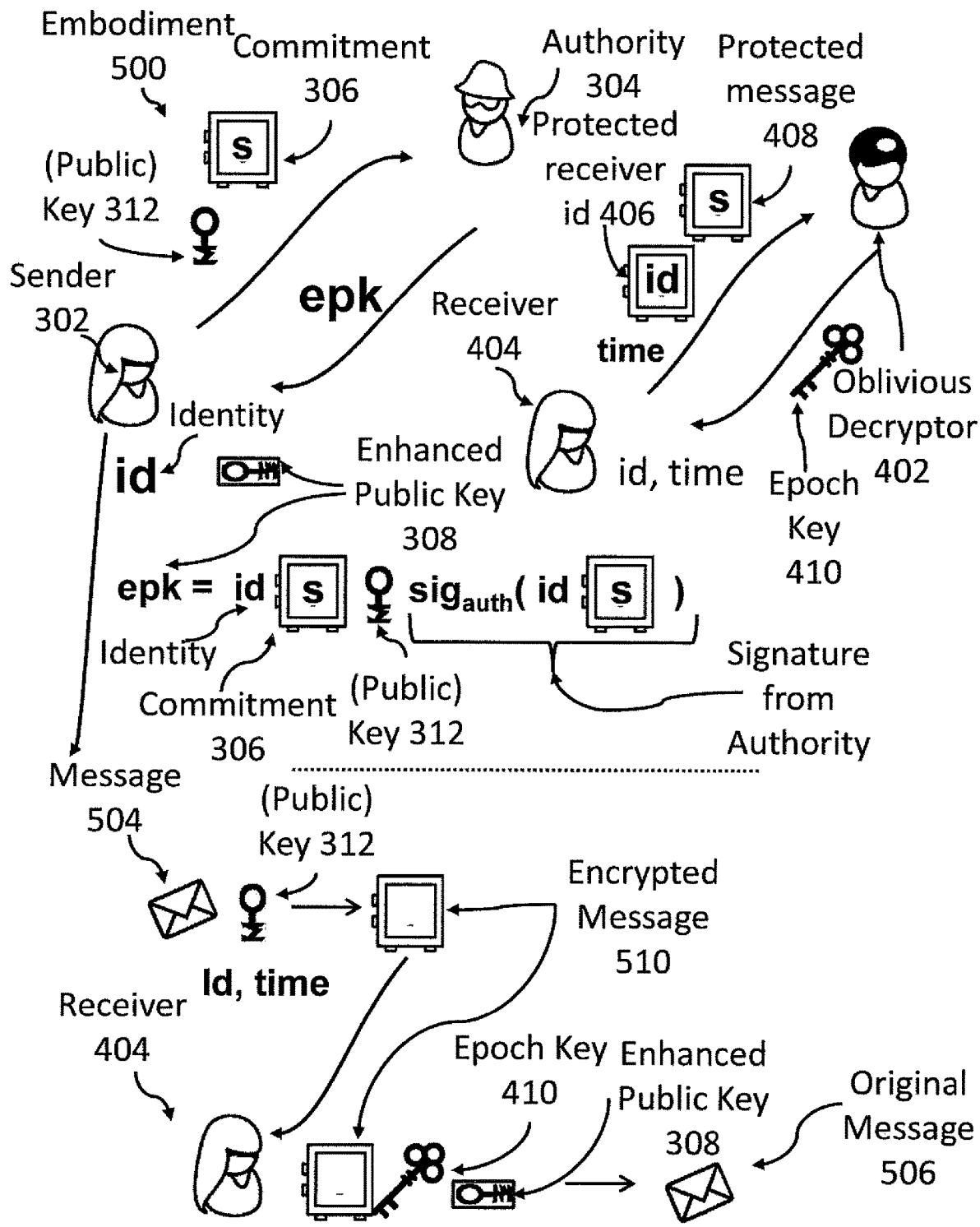
FIG. 5 shows a block diagram of an embodiment of the extended method visualizing the receiving portion by a receiver, represented by a receiver system.

FIG. 5 shows a block diagram of an embodiment 500 of the extended methods 100 and 200 visualizing the receiving portion by a receiver, represented by a receiver system 404. The upper part of the figure represents a summary of FIG. 3 and FIG. 4. The message 504, which was originally sent from the sender or sender system (compare FIG. 3, 306) to the receiver system 404, is now represented as an encrypted message 510 that has been encrypted with the ID of the sender and the time period "time" for the given time period "time". The receiver 404 can now decrypt the encrypted message 510 using the epoch key 410 (compare FIG. 4) and the enhanced public key 308 (compare FIG. 3) in order to unpack the original message 506.

Hence, the oblivious decryptor assists only once per epoch with decryption, providing a key for the epoch. There is no need that the decryptor is permanently online whenever the receiver/receiver system receives a message from the sender.

In a nutshell, the encryption is performed by computing a one-time password of the message and encrypted result with the receiver's public key. Then, the one-time password key is encrypted with the oblivious decryptor's public key based on its identity and the epoch.

The receiver decrypts the part under the oblivious decryptor's ABE key, decrypts the part encrypted under the receiver's key and composes these to plaintexts to derive the message.

Figure 6:
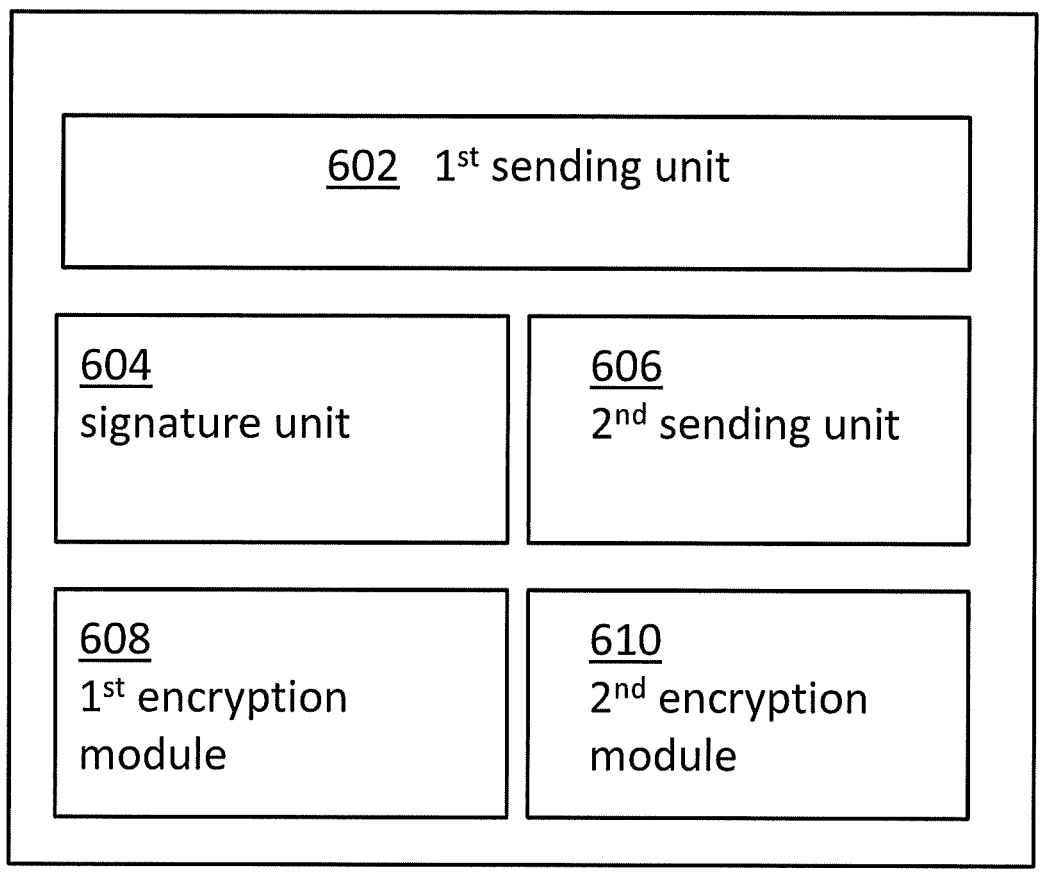
FIG. 6 shows a block diagram of an embodiment of the time-based leakage-deterring encryption system for privacy-preserving leakage-deterring public-key encryption.

FIG. 6 shows a block diagram of an embodiment of the time-based leakage-deterring encryption (TB-LDE) system 600 for privacy-preserving leakage-deterring using public-key encryption. The system comprises a first sending unit 602 adapted for sending, from a sender system, which has access to leakage-deterring-data, to an authority system, a commitment to the leakage-deterring-data, wherein the sending unit is also adapted for proving in zero-knowledge, by the sender system to the authority system, that the sender system has access to an opening to the commitment, a signature unit 604 adapted for signing, by the authority system, the commitment to the leakage-deterring-data of the sender system and an identifier of the sender system building a signature, and a second sending unit 606 adapted for sending, by the authority system, the signature to the sender system.

The system 600 also comprises a first encryption module 608 adapted for encrypting a message from the sender system to a receiver system by applying a one-time pad to the message using a one-time-pad key, wherein the first encryption module is also adapted for encrypting the result of the one-time pad applied to the message with the public key of the receiver system, and a second encryption module 610 adapted for encrypting the one-time-pad key with an ABE scheme, for which the attributes are a predefined time period data and a receiver system identifier related to the receiver system, with a public key of an oblivious decryptor system, and wherein the second encryption module is also adapted for forming a ciphertext from a combination of the encrypted message and the encrypting one-time-pad key.

It may be noted that the first encryption module and second encryption module may be implemented within the same functional unit. It may also be noted that the TB-LDE system 600 only represents the encryption part of the related method.

Figure 7:
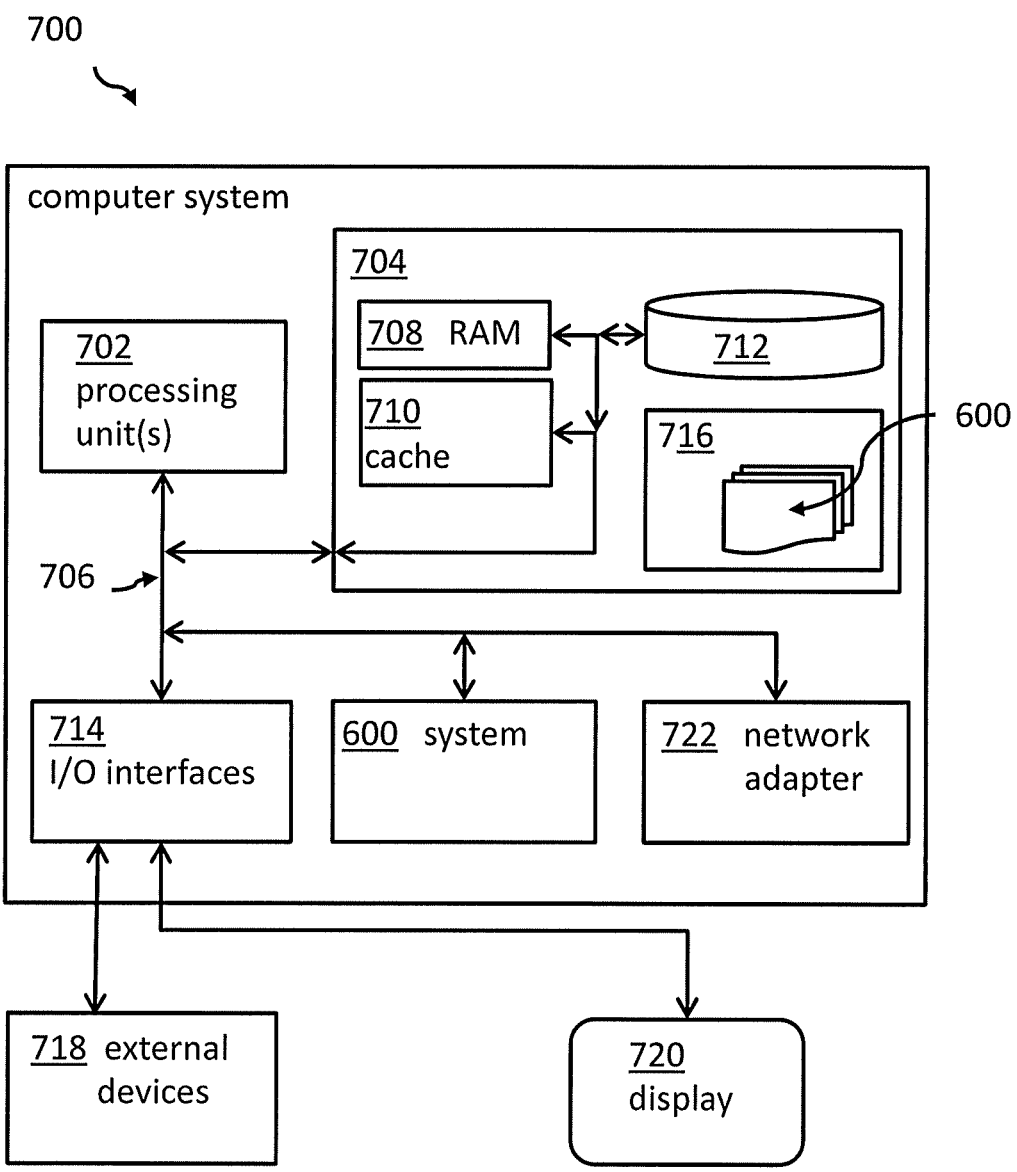
FIG. 7 shows a block diagram of a computing system comprising the system according to FIG. 6.

Embodiments of the invention may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system, and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processing unit 702. The processing unit(s) 702 may comprise one or more processors such as general purpose processors, graphics processing units, digital signal processors, application specific integrated circuits, programmable logic, or some combination of these or other circuitry. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the time-based leakage-deterring encryption system 600 for privacy-preserving leakage-deterring public-key encryption may—at least in part—be attached to the bus system 706. Furthermore, the time-based leakage-deterring encryption system 600 may be implemented in whole or in part in the programming modules 716, e.g., as computer readable code. One or more processors (e.g., as processing units 702), may cause, in response to retrieval and execution of the computer readable code, the computer system 700 to perform operations as described herein.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method, the method comprising:
   performing a commitment scheme by a sender system with a first system so both the sender system and first system have at least a first signature, the commitment scheme comprising:
      sending, as part of the commitment scheme and from the sender system, which has access to leakage-deterring data, to the first system, a commitment to the leakage-deterring data;
      proving, as part of the commitment scheme and in zero-knowledge, by the sender system to the first system, that the sender system has access to an opening to the commitment; and
      receiving, at the sender system and from the first system and as part of the commitment scheme, the first signature built from signing both a commitment to the leakage-deterring data of the sender system and an identifier of the sender system, and being the same first signature at the sender and first system;
   encrypting, in response to successful completion of the commitment scheme, a message by applying a one-time pad to the message using a one-time-pad key to create a first encrypted message;
   encrypting the first encrypted message with a public key of a receiver system to create a second encrypted message;
   encrypting, by the sender system, the one-time-pad key with an attribute-based encryption scheme, for which the attributes are predefined time period data and a receiver system identifier related to the receiver system, with a public key of a second system;
   forming, by the sender system, a ciphertext from a combination of the second encrypted message and the encrypted one-time-pad key; and
   sending, by the sender system, the formed ciphertext to the receiver system for use by the receiver system in performing a second commitment scheme with the second system to prove at least possession of a second signature from the first system, and for use by the receiver system for decryption after the receiver system has performed the second commitment scheme.

2. The method according to claim 1, wherein the leakage-deterring data are access credentials to a crypto-currency wallet.

3. The method according to claim 1, wherein the first system comprises an authority system, and wherein the identifier of the sender system is a unique authority system guaranteed label and the identifier of the authority system is another unique authority system guaranteed label.

4. The method according to claim 1, wherein the public key of the receiver system is a public portion of a public-private key pair.

5. The method according to claim 1, wherein a communication between the sender system and the first system uses a secure channel.

6. An apparatus, comprising:
   at least one memory having computer readable code thereon; and at least one processor, wherein the at least one processor causes, in response to retrieval and execution of the computer readable code, the apparatus to perform operations comprising:

performing a commitment scheme by a sender system with a first system so both the sender system and first system have at least a first signature, the commitment scheme comprising:

sending, as part of the commitment scheme and from the sender system, which has access to leakage-deterring data, to the first system, a commitment to the leakage-deterring data;

proving, as part of the commitment scheme and in zero-knowledge, by the sender system to the first system, that the sender system has access to an opening to the commitment; and receiving, at the sender system and from the first system and as part of the commitment scheme, the first signature built from signing both a commitment to the leakage-deterring data of the sender system and an identifier of the sender system, and being the same first signature at the sender and first system;

encrypting, in response to successful completion of the commitment scheme, a message by applying a one-time pad to the message using a one-time-pad key to create a first encrypted message;

encrypting the first encrypted message with a public key of a receiver system to create a second encrypted message;

encrypting, by the sender system, the one-time-pad key with an attribute-based encryption scheme, for which the attributes are predefined time period data and a receiver system identifier related to the receiver system, with a public key of a second system;

forming, by the sender system, a ciphertext from a combination of the second encrypted message and the encrypted one-time-pad key; and sending, by the sender system, the formed ciphertext to the receiver system for use by the receiver system in performing a second commitment scheme with the second system to prove at least possession of a second signature from the first system, and for use by the receiver system for decryption after the receiver system has performed the second commitment scheme.

7. The apparatus according to claim 6, wherein the leakage-deterring data are access credentials to a crypto-currency wallet.

8. The apparatus according to claim 6, wherein the first system comprises an authority system, and wherein the identifier of the sender system is a unique authority system guaranteed label and the identifier of the authority system is another unique authority system guaranteed label.

9. The apparatus according to claim 6, wherein the public key of the receiver system is a public portion of a public-private key pair.

10. The apparatus according to claim 6, wherein a communication between the sender system and the first system uses a secure channel.

11. A computer program product comprising a computer readable storage medium having program instructions embodied therewith, the program instructions executable by an apparatus to cause the apparatus to perform operations comprising:

performing a commitment scheme by a sender system with a first system so both the sender system and first system have at least a first signature, the commitment scheme comprising:

sending, as part of the commitment scheme and from the sender system, which has access to leakage-deterring data, to the first system, a commitment to the leakage-deterring data;

proving, as part of the commitment scheme and in zero-knowledge, by the sender system to the first system, that the sender system has access to an opening to the commitment; and receiving, at the sender system and from the first system and as part of the commitment scheme, the first signature built from signing both a commitment to the leakage-deterring data of the sender system and an identifier of the sender system, and being the same first signature at the sender and first system;

encrypting, in response to successful completion of the commitment scheme, a message by applying a one-time pad to the message using a one-time-pad key to create a first encrypted message;

encrypting the first encrypted message with a public key of a receiver system to create a second encrypted message;

encrypting, by the sender system, the one-time-pad key with an attribute-based encryption scheme, for which the attributes are predefined time period data and a receiver system identifier related to the receiver system, with a public key of a second system;

forming, by the sender system, a ciphertext from a combination of the second encrypted message and the encrypted one-time-pad key; and sending, by the sender system, the formed ciphertext to the receiver system for use by the receiver system in performing a second commitment scheme with the second system to prove at least possession of a second signature from the first system, and for use by the receiver system for decryption after the receiver system has performed the second commitment scheme.

12. The computer program product according to claim 11, wherein the leakage-deterring data are access credentials to a crypto-currency wallet.

13. The computer program product according to claim 11, wherein the first system comprises an authority system, and wherein the identifier of the sender system is a unique authority system guaranteed label and the identifier of the authority system is another unique authority system guaranteed label.

14. The computer program product according to claim 11, wherein the public key of the receiver system is a public portion of a public-private key pair.

15. The computer program product according to claim 11, wherein a communication between the sender system and the first system uses a secure channel.

* * * * *